United States Patent [19]

Toyoda et al.

[11] 4,341,448
[45] Jul. 27, 1982

[54] LIGHT RECEIVING ELEMENT ASSEMBLY IN A CAMERA

[75] Inventors: Kenji Toyoda; Haruo Hirano, both of Kawasaki, Japan

[73] Assignee: Nippon Kogaku K.K., Tokyo, Japan

[21] Appl. No.: 125,274

[22] Filed: Feb. 27, 1980

Related U.S. Application Data

[63] Continuation of Ser. No. 943,759, Sep. 19, 1978, abandoned.

[30] Foreign Application Priority Data

Sep. 26, 1977 [JP] Japan .................................. 52/114713

[51] Int. Cl.³ ............................................. G03B 7/00
[52] U.S. Cl. ................................... 354/59; 354/23 R; 354/60 R; 354/288
[58] Field of Search ..................... 354/23 R, 59, 60 R, 354/288

[56] References Cited

U.S. PATENT DOCUMENTS

| | | | |
|---|---|---|---|
| 3,846,805 | 11/1974 | Kiyohara et al. | 354/23 R |
| 4,134,654 | 1/1979 | Murakami et al. | 354/60 R |
| 4,146,322 | 3/1979 | Shimizu et al. | 354/60 R |
| 4,227,788 | 10/1980 | Shimizu et al. | 354/60 R |

*Primary Examiner*—Russell E. Adams
*Attorney, Agent, or Firm*—Shapiro and Shapiro

[57] ABSTRACT

In a light receiving element assembly in a camera, a light receiving element chip is provided in a first package and an IC chip for treating the output signal of the light receiving element is provided in a second package. A portion of the second package is extended so that a conductor pattern extended from the IC is provided on the extension. The output terminal of the light receiving element housed in the first package is connected to said pattern by soldering.

11 Claims, 4 Drawing Figures

LIGHT RECEIVING ELEMENT ASSEMBLY IN A CAMERA

This is a continuation application of Ser. No. 943,759, filed Sept. 19, 1978, now abandoned.

BACKGROUND OF THE INVENTION

1. Field of the Invention

This invention relates to a light receiving element assembly used for the photometry device in a camera.

2. Description of the Prior Art

A light receiving element assembly for the photometry device is known in which an IC (integrated circuit) is connected to a printed base plate and a light receiving element housed in a package is connected to the printed base plate, both by soldering, in order to connect the light receiving element to the IC for treating the output signal from the element. This device requires a number of soldered connecting portions between the IC and the printed base plate and between the printed base plate and the light receiving element. The number of soldered connecting portions may result in large leakage current flowing between such soldered portions. It is also known to eliminate the soldered connecting portions by disposing an IC chip and a light receiving element chip in a single package and connecting them together by wire bonding, but in this case, full examination of the two individually cannot be done, and this results in a large number of defective assemblies.

SUMMARY OF THE INVENTION

It is an object of the present invention to eliminate the above-noted disadvantages and to provide a light receiving element assembly in which the IC and the light receiving element can be individually examined and in which the soldered portions are reduced.

According to the present invention, the light receiving element chip assembly has a light receiving element provided in a first package and has an IC chip for treating the output signal of the light receiving element in a second package. A portion of the second package is extended so that a conductor pattern extended from the IC is provided on the extension. The output terminal of the light receiving element housed in the first package is connected to said pattern by soldering.

The invention will become more fully apparent from the following detailed description thereof taken in conjunction with the accompanying drawings.

DESCRIPTION OF THE PREFERRED EMBODIMENTS

Figure 1:
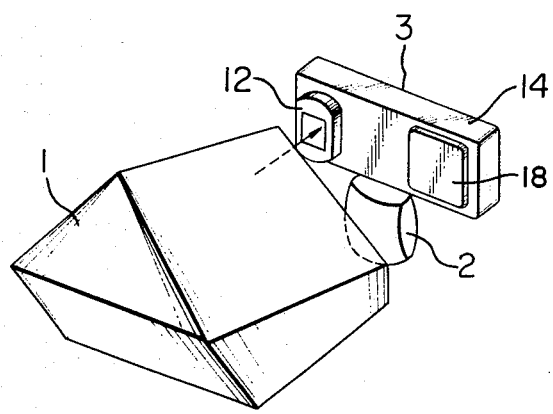
FIG. 1 is a schematic perspective view of a first embodiment of the present invention.
Figure 2:
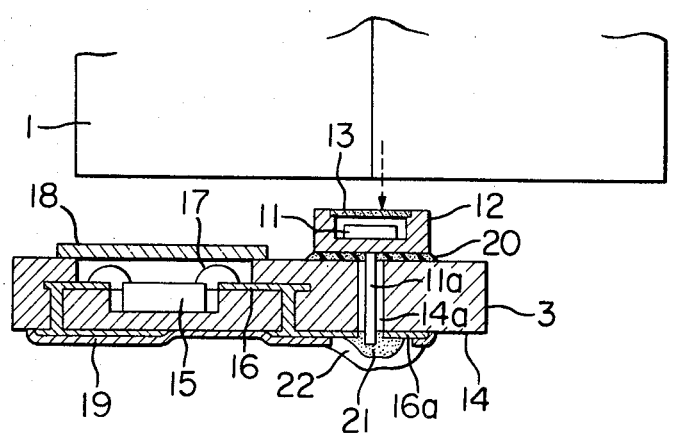
FIG. 2 is a cross-sectional view of the light receiving element assembly according to the first embodiment.

Referring to FIGS. 1 and 2, there is shown a first embodiment of the present invention. FIG. 1 is a schematic perspective view, and FIG. 2 is a cross-sectional view of the assembly of the present invention. In FIG. 1, reference numeral 1 designates the pentaprism of a single lens reflex camera, 2 an eyepiece and 3 the light receiving element assembly of the present invention. In FIG. 2 which shows details of the assembly, a light receiving element chip 11 is formed of SPD (silicone photodiode) or GPD (gallium arsenic phosphor diode) and receives emergent light from pentaprism 1. The light receiving element chip is housed in a first package 12 having an output terminal 11a connected by wire bonding with the light receiving element chip. Although only one output terminal is shown, there are two such output terminals, of course. A filter 13 is positioned in front of the light receiving element 11 and serves as a spectral sensitivity correction of the light receiving element as well as for air-tight sealing. In a second package 14 formed of a block of insulating material as shown, there are provided an IC chip 15 for treating the output of the light receiving element 11 and a conductor pattern 16. These two are coupled together by bonding wire 17. Lid 18 closes the cavity of package 14 in which the IC 15 is mounted and shields the IC 15 from atmosphere. An insulating coat 19 covers the conductor pattern 16 exposed on the surface of the package 14. The conductor pattern 16 has an extension 16a extending onto the second package so as to be coupled to the output terminal 11a of the light receiving element, as shown in FIG. 2. The aforementioned first package 12 is fixed onto one surface of the second package 14 by means of an adhesive 20 formed of an insulating material, and the output terminal 11a thereof is projected through a through-hole 14a onto the other surface of the package 14 and connected to the extension 16a of the conductor by solder. Insulating varnish 22 such as silicone or the like covers the neighborhood of a soldered connecting portion 21.

In the above-described embodiment, the output terminal 11a of the light receiving element is covered with an insulator (in the embodiment, the adhesive 20, the bottom surface of the first package 12, the wall surface of the through-hole 14a of the second package and the insulating varnish). Therefore, there is no possibility that dust can be deposited on the bottom surface of the first package. Dust absorbs humidity and can cause leakage current to flow between the output terminals 11a of the light receiving element. However, if the first package having the light receiving element and the second package having the IC cannot be disposed adjacent to each other, the output terminal of the light receiving element will be exposed to the atmosphere and there will be a possibility that the current may leak through humid dust deposited on the surface of the package or the like. This can be prevented by a second embodiment of the present invention.

Figure 3:
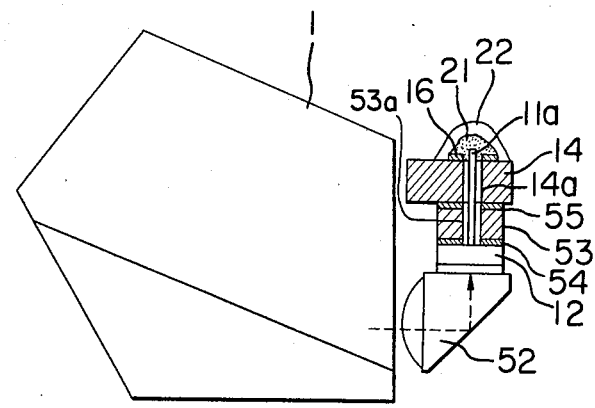
FIG. 3 is a cross-sectional view of a second embodiment of the present invention as seen from the side thereof.
Figure 4:
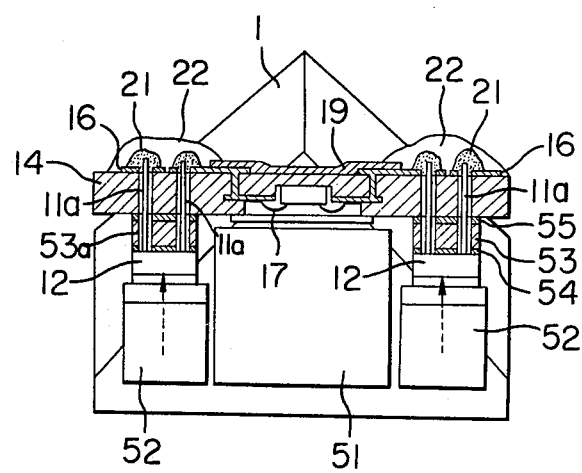
FIG. 4 is a cross-sectional view of a second embodiment as seen from the rear thereof.

FIG. 3 is a cross-sectional view of the second embodiment as seen from the side thereof, and FIG. 4 is a cross-sectional view of the second embodiment as seen from the back thereof. Elements similar to those in the aforementioned first embodiment are given similar reference characters and need not be described. In the second embodiment, first packages 12 each having a light receiving element chip are provided on the opposite sides of an eyepiece portion 51, and the light receiving element 11 is provided to face down, so that the light emergent from the pentaprism 1 may pass through a rectangular prism 52 to the light receiving element 11. In this second embodiment, the clearance between the first package 12 and the second package 14 is large and therefore, a spacer 53 is provided therebetween. The spacer 53 is formed of an insulator and fixed to the first package 12 and the second package 14 by means of adhesives 54 and 55, respectively. A pair of through-holes 53a formed in the spacer directs therethrough the output terminals 11a of the light receiving element 11 into the through-holes 14a formed in the second package. Thus, each output terminal 11a is covered with an insulator (in the present embodiment, the bottom surface of the first package 12, the wall surface of the through-hole 53a in the spacer 53, the wall surface of the through-hole 14a in the second package, the adhesives 54, 55, and the insulating varnish 22) and there is no possibility that dust deposited on the surface of the first package 12, for example, can absorb the humidity in the atmosphere to permit leakage current to flow between the output terminal 11a of the light receiving element.

In the present embodiment, the spacer 53 is provided between the two packages, but instead of doing so, an extension of the first package may be provided to serve the function of the spacer 53. Or alternatively, an extension of the second package 14 may be provided to serve the function of the spacer 53.

According to the present invention, as has been described in detail, an IC chip is incorporated in a package and a light receiving element chip is incorporated in another package, and the conductor pattern extended from the IC provided on an extension of the IC package is connected to the output terminals of the light receiving element by solder to make the two packages integral with each other. Therefore, the IC and the light receiving element can be individually examined at the stage whereat the IC and the light receiving element are incorporated in the respective packages, thus reducing the rate of defective assemblies. Also, the soldering is used only between the output terminals of the light receiving element and the conductor pattern, so that the leakage current can be minimized. In recent years, photoelectromotive elements (for example, SPD or GPD) have become used as the light receiving element because of their better responsiveness and more excellent linearity than photoconductive elements, but such photoelectromotive elements have small output current and leakage current is a greater problem in them. Where such a material is used, the use of the assembly of the present invention is particularly effective to reduce the leakage current in the soldered connecting portion.

If, as mentioned in connection with the embodiments, all the output terminals of the light receiving element are covered with an insulator, dust will not be deposited in the neighborhood of the output terminals, and there is no possibility that such dust can absorb humidity to permit leakage current to flow between the output terminals.

We claim:

1. A light receiving element assembly in a camera comprising:
   a block of insulating material having a cavity therein;
   a light receiving element enclosed in a package having output terminals connected to the light receiving element, the package being mounted on the block of insulating material;
   an integrated circuit chip for treating an output signal from the light receiving element, the integrated circuit chip being enclosed within said cavity to shield the integrated circuit chip from the atmosphere;
   a conductor pattern having a first portion disposed within the block of insulating material and terminating within the cavity, and connected to the integrated circuit chip, and having a second portion disposed on a surface of the block of insulating material and connected to said output terminals of the package enclosing the light receiving element; and
   an insulating material covering the portion of the conductor pattern on said surface and the output terminals to shield such portion of the conductor pattern and the output terminals from the atmosphere and reduce leakage currents flowing between the output terminals.

2. A light receiving element assembly according to claim 1, comprising a through-hole which passes through the block of insulating material from said first-mentioned surface to another surface thereof, and wherein the package is mounted on the other surface with the output terminals extending through the through-hole and being connected to the conductor pattern on the first-mentioned surface by soldering, and the integrated circuit chip being connected to the portion of conductor pattern within the block of insulating material by wire bonding.

3. A light receiving element assembly according to claim 1 further comprising an insulating adhesive for mounting the package on the block of insulating material.

4. A light receiving element assembly according to claim 1 further comprising an insulating spacer for mounting the package on the block of insulating material spaced therefrom.

5. A light receiving element assembly according to claim 4, wherein the light receiving element package includes a light transmissive filter for airtight sealing of the package and for spectral sensitivity correction of the light receiving element.

6. A light receiving element assembly according to claim 4, comprising a second light receiving element enclosed in a second package mounted on the block of insulating material, the second package having second output terminals connected to the second light receiving element, the second terminals being connected to the conductor pattern.

7. A light receiving element assembly according to claim 5, wherein the conductor pattern is free of solder connections except for its connection to the output terminals of the light receiving element.

8. A light receiving element assembly in a camera comprising:
   a block of insulating material having through-hole means which passes through the block of insulating material from a first surface thereof to a second surface thereof and having a cavity therein;
   a light receiving element enclosed in a package having output terminals connected to the light receiving element, the package being mounted on the first surface of the block of insulating material with the output terminals extending through the through-hole means from the first surface to the second surface;
   an integrated circuit chip for treating an output signal from the light receiving element, said integrated circuit chip being enclosed in said cavity in the block of insulating material such that the integrated circuit chip is shielded from the atmosphere;
   a conductor pattern within the block of insulating material, said conductor pattern having a first portion terminating within the cavity and being connected to the integrated circuit chip by wire bonding and having a second portion disposed on said second surface, said second portion being connected to the output terminals of the light receiving element on the second surface by soldering; and an insulating material covering the second conductor pattern portion and the output terminals to shield the second conductor pattern portion and output terminals from the atmosphere and to reduce leakage current.

9. A light receiving element assembly for use in a camera having a pentaprism and an associated eyepiece comprising:

a prism member adapted to be positioned adjacent to the eyepiece and to the pentaprism for receiving a portion of a light beam passing through an emergent light surface of the pentaprism, the prism member reflecting said portion of the light beam along the emergent light surface of the pentaprism;

a package enclosing a light receiving element for receiving the reflected light beam from the prism member, the light receiving element having output terminals for producing outputs responsive to the amount of light received;

a block of insulating material having a cavity therein and extending along the emergent light surface of the pentaprism, the package being mounted on the block of insulating material;

an integrated circuit chip for treating a signal from the light receiving element, the integrated circuit chip being enclosed within the cavity in the block of insulating material; and a conductor pattern having a first portion disposed within the block of insulating and terminating within the cavity and connected to the integrated circuit chip, and having a second portion disposed on a surface of the block of insulating material and connected to the output terminals of the light receiving element, thereby forming said light receiving element assembly along the emergent light surface of the pentaprism; and insulating material covering said output terminals and said second portion to shield the output terminals and the second portion from the atmosphere and reduce leakage currents flowing between the output terminals.

10. A light receiving element assembly according to claim 9, wherein the integrated circuit chip is connected to the first portion of the conductor pattern by wire bonding, and the output terminals of the light receiving element are connected to the second portion of the conductor pattern by soldering.

11. A light receiving element assembly according to claim 9, wherein the block of insulating material has through-hole means extending from a first surface thereof to a second surface thereof, and wherein said package is mounted on the first surface with said output terminals extending through said through-hole means, and said second portion of the conductor pattern is disposed on said second surface.

* * * * *